3,270,052
TRIS(2-CARBAMOYLETHYL)-PHOSPHINE AND ITS METHYLOL DERIVATIVES
Leon H. Chance, New Orleans, and Wilson A. Reeves and George L. Drake, Jr., Metairie, La., assignors to the United States of America as represented by the Secretary of Agriculture
No Drawing. Filed Feb. 8, 1963, Ser. No. 257,342
3 Claims. (Cl. 260—561)

A nonexclusive, irrevocable, royalty-free license in the invention herein described, throughout the world for all purposes of the United States Government, with the power to grant sublicenses for such purposes, is hereby granted to the Government of the United States of America.

This invention relates to tris(2-carbamoylethyl)phosphine having the formula

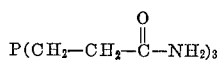

to the methylol derivatives of this compound and to the use of these compounds for the preparation of new modified cellulosic textiles. The methylol derivatives have been found to be effective as fire retardants and can be used for the treatment of normally flammable cellulosic materials to increase their resistance to combustion and burning. They also impart crease resistance, rot resistance, and dimensional stability to cellulosic fibers.

Tris(2-carbamoylethyl)phosphine may be prepared by reacting ammonia with tris(2-carbethoxyethyl)phosphine of the formula

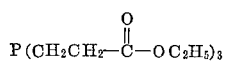

The reaction may be carried out over a temperature range of from about 25° to 100° C. with the formation of the desired product and ethanol. The reaction proceeds more rapidly at the higher temperatures, and in some cases at the higher temperatures it is desirable to carry out the reaction at pressures greater than atmospheric pressure.

The reaction is carried out in the presence of aqueous ammonia. In some cases the reaction may be facilitated by adding a water soluble alcohol such as ethanol or methanol. The function of the alcohol is to bring the ester into solution in the aqueous ammonia. Upon completion of the reaction, the desired product may be separated by evaporation of a portion of the solvent and allowing the product to crystallize. The tris(2-carbamoylethyl)phosphine is a white crystalline solid and is weakly basic in character.

In an alternative process, tris(2-carbamoylethyl)phosphine may be prepared by acid hydrolysis of tris(2-cyanoethyl)phosphine having the formula $$P(CH_2-CH_2\equiv N)_3$$

The hydrolysis may be carried out in the presence of mineral acids such as sulfuric or hydrochloric acid at temperatures ranging from about 25° C. to 100° C. The reaction may also be carried out in the presence of an organic solvent such as dioxane. Three moles of water for each mole of tris(2-cyanoethyl)phosphine is required in the hydrolysis to produce tris(2-carbamoylethyl)phosphine. Upon completion of the reaction the mixture is neutralized with a base such as ammonia or sodium hydroxide, and the product allowed to crystallize from the solution.

Tris(2-carbamoylethyl)phosphine reacts readily with formaldehyde in aqueous acid or alkaline solution to form the N-methylol derivatives. Alkaline conditions are preferred for preparation of the methylol derivatives. In an acid system the formaldehyde reacts with the amide within the range of and including the mole ratios of 1 to 1 and 1 to 6 to form the water soluble methylol derivatives, then these begin to condense to form insoluble flame resistant polymers. Six moles of formaldehyde per mole of the phosphine can react, but the derivatives containing one, two, or three methylol groups are the most stable. Best results are obtained on a cellulosic textile when three moles of formaldehyde react.

Cellulosic textile fiber, yarns and fabrics can be made flame resistant, crease resistant, rot resistant, resistant to damage by chlorine bleaching, and dimensionally stable in accordance with this invention. The process consists essentially of impregnating the textile materials with an aqueous solution of the methylol derivatives and curing the impregnated materials at the temperatures conventionally used for curing cellulosic textiles.

The time and temperature required for the cure is partially dependent upon the weight of fabric being treated. The temperature can range from about 100° C. up to about 170° C. The time can vary from less than one minute up to about 30 minutes. The rapid cures are accomplished at the higher temperatures.

Surface active agents, water repellents, and softening agents may be incorporated into the treating media. Softening agents improve the hand and tearing strength of cotton and rayon textiles.

Simultaneous polymerization within and crosslinking of the cellulose molecules of the fibers provided by this invention are produced in the presence of an acid catalyst. Catalysts suitable for the reaction are those conventionally employed in applying methylol amides to cellulosic materials which are Lewis and protonic acids. They include latent acid catalysts such as magnesium chloride, zinc nitrate, zinc fluoborate, and amine hydrochlorides.

When a cotton textile is being treated, it is of advantage to pass it through the impregnating liquor to thoroughly wet it and remove the excess liquor by passing the textile through squeeze rolls. It is also advantageous to dry the textile at a temperature of about 60° to 120° C. before curing. The preferred curing conditions are from about 140° to 170° C. for 10 to 1 minute using the longer time for the lower temperature.

The degree of flame resistance and crease resistance can be varied from a low to a high degree by varying the amount of polymer and crosslinking put into the textile. Considerable improvement in dimensional stability is obtained with as little as 1% add-on of the finish. About 3 to 15% add-on is needed for a high degree of improvement in crease resistance and smooth drying properties of a cotton fabric.

Some advantages of treating cotton textiles in accordance with this invention are: flame and glow resistance, shrink resistance, rot and mildew resistance, crease resistance, permanence to laundering and dry cleaning, and resistance to damage caused by chlorine bleaching followed by scorching. The presence of the phosphine group is of particular value in this textile finish because of its slight base properties. The phosphine group is sufficiently basic to neutralize the degrading action of acids on cellulose when the textile is exposed to sunlight or to elevated temperatures as by ironing.

The following examples are illustrative of the invention: The textile testing data shown in the examples were obtained by standard methods of the American Association of Textile Chemists and Colorists. All parts are by weight.

EXAMPLE 1

*Tris(2-carbamoylethyl)phosphine (method 1)*

Tris(2 - carbethoxyethyl)phosphine (17.0 parts) and concentrated aqueous ammonia containing 28.7% ammonia (50.0 parts) were stirred together for 16 hours at room temperature. A portion of the ester still remained undissolved. Ethanol (10 parts) was added to bring the ester into solution. The solution was placed in a closed reaction vessel and heated for three hours at 95° to 100° C. under autonomous pressure. The vessel was cooled and the resulting solution evaporated until the solution became slightly viscous. The solution was cooled and white crystals separated. The crystals were insoluble in benzene, acetone, chloroform, ethyl acetate, and ethyl alcohol, and slightly soluble in cold water. Pure crystals melting at 191.5°–192.5° C. (corrected) were obtained on recrystallizing from hot water. Infrared absorption data showed the presence of amide groups.

*Analyses.*—Calculated for $C_9H_{18}N_3O_3P$: C, 43.72; H, 7.34; N, 16.98; P, 12.53. Found: C, 43.55; H, 7.36; N, 16.86; P, 12.77.

EXAMPLE 2

*Tris(2-carbamoylethyl)phosphine (method 2)*

Tris(2-cyanoethyl)phosphine (9.65 parts) and water (2.7 parts) were placed in a flask containing 1,4-dioxane (60 parts). The flask was equipped with a mechanical stirrer, thermometer, gas diffusion tube, and reflux condenser. The flask was also equipped for external cooling. While stirring, dry hydrogen chloride (5.5 parts) was bubbled into the mixture while maintaining the temperature below 45° C. by external cooling. A viscous material separated during the reaction. The dioxane was decanted from the viscous material. Water (10 parts) was added to the viscous material to dissolve it. The water solution was neutralized with concentrated ammonium hydroxide. The solution was cooled in a refrigerator, and white crystals separated. The crystals were identical with those obtained by method 1.

EXAMPLE 3

*Methylol derivative of tris(2-carbamoylethyl)phosphine*

Tris(2-carbamoylethyl)phosphine (2.4 parts) was added to water (10 parts). Aqueous formaldehyde (2.7 parts of 36.3% formaldehyde) was added and the pH adjusted to 11 with dilute sodium hydroxide solution. The crystals dissolved, and the solution was allowed to stand at room temperature for about 20 hours. The mole ratio of the phosphine to formaldehyde was 1:3. The resulting solution consisted largely of the trimethylol derivative of tris(2-carbamoylethyl)phosphine.

EXAMPLE 4

The solution obtained from Example 3 was adjusted to a pH of 4.5 with concentrated hydrochloric acid. Magnesium chloride hexahydrate (0.33 part) was added and the solution diluted with water (6.5 parts). The resulting solution contained approximately 15% of the trimethylol derivative and 1.5% magnesium chloride hexahydrate. The final pH of the solution was 4.5. The solution was padded on to cotton print cloth to a wet pickup of about 100%. The fabric was dried in a forced draft oven at 60° C. for 7 minutes and then cured in the same oven at 160° C. for 3 minutes. The fabric was washed and dried. The fabric had an add-on of 15%. It exhibited considerable flame resistance and left a tough charred material which retained the fabric structure. There was no afterglow. The wet wrinkle recovery was 267° and the dry wrinkle recovery was 274° as measured by the Monsanto wrinkle recovery tester. The wrinkle recovery of the untreated print cloth was 160° (wet) and 179° (dry). Wrinkle recovery values are the sum of warp and filling directions. The fabric retained 91% of its strength after chlorine bleaching followed by scorching. The fabric was shrink resistant and resistant to mildew and rot.

We claim:

1. Tris(2-carbamoylethyl)phosphine,

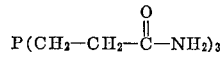

2. A methylol derivative of tris(2-carbamoylethyl)-phosphine having the formula

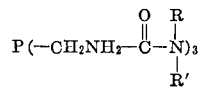

wherein R and R' are selected from the group consisting of H— and —CH$_2$OH, and the number of —CH$_2$OH groups present is within the range of 1–6, inclusive.

3. A methylol derivative of tris(2-carbamoylethyl)-phosphine having the formula

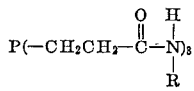

wherein R is a member of the group consisting of H— and —CH$_2$OH, and the number of —CH$_2$OH groups present is within the range of 1–3, inclusive.

References Cited by the Examiner

UNITED STATES PATENTS

| | | | |
|---|---|---|---|
| 2,203,493 | 6/1940 | Evans et al. | 8—116.3 |
| 2,234,889 | 3/1941 | Boulton et al. | 8—116.3 |
| 2,961,465 | 11/1960 | Contois | 260—561 |
| 3,005,013 | 10/1961 | Grayson et al. | 260—561 |
| 3,052,719 | 9/1962 | Buckler et al. | 260—561 |
| 3,067,251 | 12/1962 | Rauhut et al. | 260—261 |

OTHER REFERENCES

Migrdichian, Organic Synthesis, vol. I, pages 367 and 429, New York, Reinhold, 1957.

Noller Chemistry of Organic Compounds, 2nd ed., pages 171 and 244–5, Philadelphia, Saunders, 1957.

Rauhut: Jour. Org. Chem., vol. 26, page 5142 (1961).

Wolf et al., German Application 1,082,910, printed June 9, 1960.

WALTER A. MODANCE, *Primary Examiner.*

N. G. TORCHIN, *Examiner.*

H. WOLMAN, NATALIE TROUSOF,
*Assistant Examiners.*